June 6, 1967  J. P. MAGOS ET AL  3,323,542
FABRICATED BALL VALVE
Original Filed Sept. 18, 1961  3 Sheets-Sheet 1

Inventors,
John P. Magos,
Kurt B. Bredtschneider, &
Joseph H. Englert.
By Joseph O. Large
Atty.

June 6, 1967 — J. P. MAGOS ET AL — 3,323,542
FABRICATED BALL VALVE
Original Filed Sept. 18, 1961 — 3 Sheets-Sheet 2

Inventors,
John P. Magos,
Kurt B. Bredtschneider, &
Joseph A. Englert.
By Joseph O. Lange Atty.

June 6, 1967  J. P. MAGOS ET AL  3,323,542
FABRICATED BALL VALVE

Original Filed Sept. 18, 1961  3 Sheets-Sheet 3

Inventors,
John P. Magos,
Kurt B. Bredtschneider, &
Joseph A. Englert.
By Joseph O. Langto
Atty.

United States Patent Office 3,323,542
Patented June 6, 1967

3,323,542
FABRICATED BALL VALVE
John P. Magos, Wilmette, and Kurt B. Bredtschneider and Joseph A. Englert, Chicago, Ill., assignors to Crane Co., Chicago, Ill., a corporation of Illinois
Original application Sept. 18, 1961, Ser. No. 138,884. Divided and this application Dec. 17, 1962, Ser. No. 245,944
1 Claim. (Cl. 137—315)

This invention relates generally to a type of rotary valve known as a ball valve, and, more specifically, it is concerned with what is termed a fabricated type of ball valve.

This application is a division of patent application Ser. No. 138,884, filed Sept. 18, 1961, and entitled, "Fabricated Ball Valve," and since abandoned.

In the manufacture and assembly of this type of valve, it is frequently desirable not only to provide assurance of the integrity of the material used in making the valve, but also to provide a structure and arrangement of the parts constructed therefrom, enabling the valve to be easily assembled and conveniently adjusted.

In valves of this type, the rotary closure member employed should not only be adequately sealed to provide fluid tightness, but also to be capable of being assembled relatively economically, while at the same time obtaining the benefits of strengthening and stiffening the valve casing and the inner valve assembly forming the seat portions thereof.

The instant device herein disclosed relates to a fabricated ball valve construction having a tube-like casing formed to receive a ported spheroidal closure member wherein axially adjustable backup ring members having limitedly axially movable seat carrying rings are positioned in fluid sealing relation with the closure member.

An object of this invention is to provide for a fabricated ball valve construction in which the parts thereof or at least a substantial portion of such parts are readily obtainable as products in open market stocks, in such forms as pipes, tubes, connectors, flanges, pipe nipples, bushings, and the like.

Another object is to provide for a fabricated ball valve structure in which the attachment of such parts can easily be made in a fluid sealing manner, say, by welding or brazing with a minimum of expense.

Another object is to provide for a fabricated valve structure in which the actuating mechanism, such as the valve stem, may be well supported and guided in the course of its operation, notwithstanding the severe service to which the valve may be exposed in the field.

Other objects and advantages will become more readily apparent upon proceeding with the following description, read in light of the accompanying drawings, in which.

Similar reference numerals refer to similar parts throughout the several views.

Figure 1:
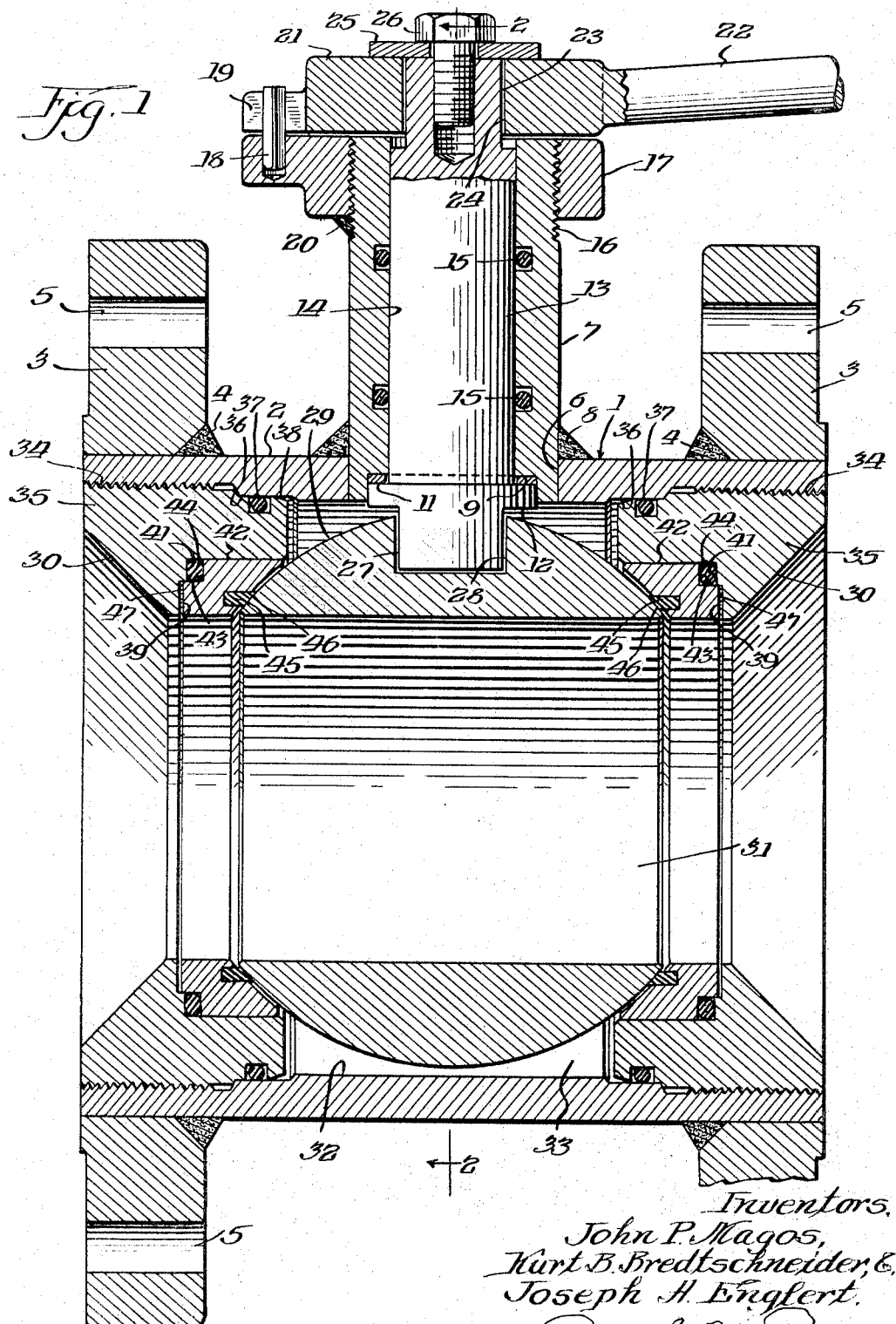
FIG. 1 is a sectional assembly view of a preferred embodiment of our invention.

Referring now to FIG. 1, the casing generally designated 1 consists of a short length of tubing 2 preferably of stock material and upon which the end flanges 3 are mounted on a peripheral portion thereof. The latter are preferably weld secured thereto as at 4, but may be attached in other convenient ways. The flanges are drilled in the usual manner at 5 to permit the use of conventional end connecting bolts (not shown) for attachment to a pipe line in the usual manner. To complete the construction of the casing 1, the latter is apertured as at 6 to receive the tubular member 7 at right angles thereto, the latter member also being preferably weld secured annularly as at 8 to the casing 1, as shown. The tubular extension 7 is a construction also preferably using a stock pipe material and is recessed as at 9 at its inner end to receive the thrust washer 11 and the integral annular collar 12 of the rotatable valve actuating stem 13. The latter member, as shown, is snugly received within the inner annular surface 14 of the extension tube 7 and is provided in such bearing with the usual fluid seals such as the O-rings 15. At its outer end portion, the extension tube 7 is threaded as at 16 to receive the similarly threaded flange member 17 locked against rotation by tack weld 20. It will be noted that the latter member by reason of its carrying the stop pin 18 limits the rotative motion of the stem 13 and thereby restricts the latter member to ninety degrees arcuate movement of the pin 18 within the arcuately extending recess 19 of the handle 21, the latter having the usual extension 22 for manual gripping in effecting the said ninety degrees of stem rotative movment. The said handle is non-rotatably mounted relative to the stem 13 by means of the polygonal limit portion 23 fitted within the similarly shaped opening 24 of the handle 21. For purpose of securing attachment of the said handle, the usual washer 25 and a retaining nut 26 are provided.

Directing attention now to the inner end portion of the stem 13, it will be noted that the latter member is formed with flattened sides as at 27 whereby to non-rotatably engage the transversely extending slot 28 of the valve closure member 29. The said closure member is of spheroidal configuration and has the port 31 therethrough in the valve open position as shown communicating with outwardly flared end ports 30. To those skilled in the art, the closure member 29 is known as the floating type and is inserted from the end of the casing before a backup ring as hereinafter explained is placed in position. It should be noted that preferably it does not contact the lower inner peripheral surface 32 of the casing and therefore is not supported on the said tubing inner surface. Such arrangement permits an annular valve chamber 33 to be formed around the closure member except for those outer portions thereof supported by the end disposed seating elements therefor immediately hereinafter to be described.

The tubular casing 1 is threaded in the latter connection as at 34 to receive the annular positioned back-up ring member 35 previously referred to, which at its inner end portion is relatively snugly received within the tubular casing as at the bored portion 36. Preferably, it is fluid sealed on its inner periphery by means of the O-ring 37 and for purpose of facilitating its entry into the bore 36 it is chamfered annularly at 38.

At a median portion thereof and facing inwardly, the back-up ring 35 is annularly shouldered at inner and outer peripheral portions as at 39 and 41 respectively thus to receive the outer annular projections of the seat carrying ring 42. Preferably, at a corner annular portion thereof, the latter element is recessed as at 43 to receive the sealing element or O-ring 44. Preferably, the sealing ring 44 is under moderate compression as shown to direct the seat carrying ring toward said closure member.

At its inner concave periphery, the seat ring element 42 is preferably provided with a pressed-in composition seat ring 45 such as one of the many plastics available. It will also be noted that on its inner portion, the said seat element 45 is formed with a substantially tapered annular surface 46 whereby to receive in fluid sealing relation the outer speroidal surface defining the closure member 29. Thus, it should be apparent that between the back-up ring annular shoulder 39 and the annular surface 47 of the seat carrying ring 42 a slight annular clearance is provided which permits of line fluid pressure to enter therebetween. Such provision thus enables a thrust force to be exerted inwardly, depending upon the direction from which the line fluid is applied. The said structural arrangement increases the degree of fluid sealing contact made between the surface 46 and the outer spheroidal surface of the closure member 29. At the same time, it will also be appreciated that because of the movement of the closure member 29 slightly transversely in response to fluid pressure within the casing the seat carrying member 42 will be moved downstream and thereby deforming the sealing ring 44 further to increase and improve the efficiency of the sealing means in accomplishing fluid tightness between the closure member and the casing. A simple but very effective fabricated ball valve assembly is the end result, possessing desirable flexibility and with ease of inspection and maintenance.

Figure 2:
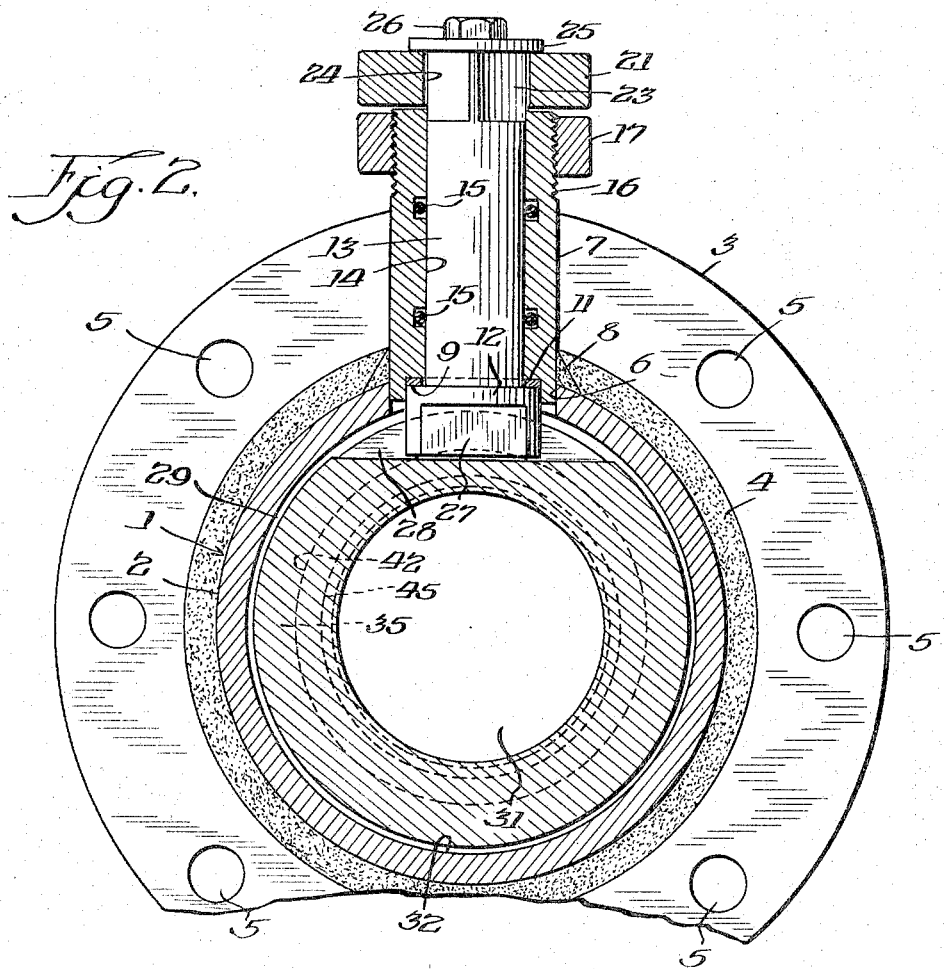
FIG. 2 is a sectional view taken on the line 2—2 of FIG. 1.
Figure 3:
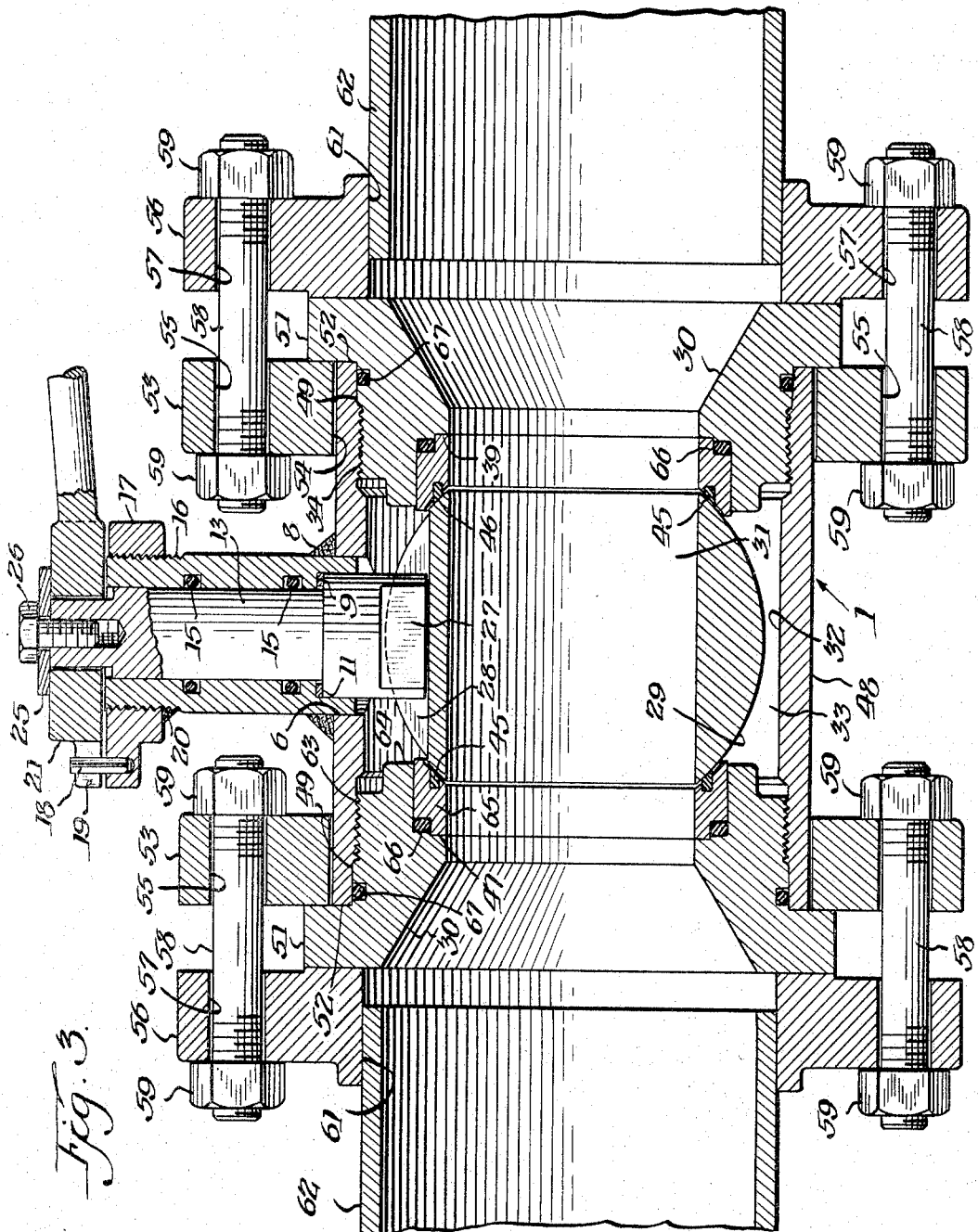
FIG. 3 is a sectional assembly view of a modified form of the invention.

Referring now to FIG. 3 in a further modified form of the casing, the latter member generally designated 1 receives a novel type of end mounting for connection to a pipe line which cooperates with the back-up ring and differs from that construction described in connection with FIGS. 1 and 2. In the instant modification, the tubular casing herein designated 48 is provided with plain outer ends in substantially the same manner as described in connection with FIGS. 1 and 2. It is therefore threaded as at 63 to receive the back-up ring 49 having on its outer end portion an annular flange 51, the inner surface of said flange preferably drawing up to and abutting an annular shoulder 52 defining the outer end limits of the casing 1. It will be understood that before the ring 49 is placed in the assembled position illustrated, the flange member 53 apertured as at 54 is slipped in relatively close relation over the outer peripheral portion of the tubing 48 so as to be axially movable slidably thereover. It will be appreciated that this provision for mounting the flange 53 (and also the flange 3 of FIG. 1) serves as stiffening rings to reinforce the casing 1 adjacent to the respective threads 63 of back-up ring 49 and the threads 34 of back-up ring 35 of FIG. 1. Substantial avoidance of line strains is overcome insofar as damaging or distorting the threads 63 and 34 of the respective back-up ring is concerned. In addition, the sealing means at 37 and 67 are likewise protected.

As shown, the flanges are provided with the usual spaced apart annularly disposed bolt holes 55 for engagement with similar axially aligned outer flanges 56 in effecting the connection of the valve to a pipe line. The flanges 56 are also apertured as at 57 for the purpose of receiving a plurality of attaching studs 58 in which by means of the latter elements and the end connecting nuts 59 provide for clamping the annular portion 51 of the back-up ring 49 therebetween as shown. It will be noted that in this figure as shown at 66 the O-ring contained therewithin is under maximum compression without collapsing the said O-ring.

The outer flange 56 is threaded, bored, or otherwise formed as at 61 to receive the usual tubing or pipe 62 with either a screwed joint, brazed joint, a solder connection, or a weld as desired. The inner portion of the back-up ring 49 being threaded as at 63 engages the tubing 48 constituting the casing and preferably is provided with an inner annular hollow extension portion 64 to receive the seat carrying ring 65, the latter member being annularly sealed at an outer corner annular portion as at 66 in the same manner as described in connection with FIGS. 1 and 2. The seat carrying ring 65 similarly carries an annular seat 45 likewise functioning to engage the spheroidal surface of the closure member 29 for the same purpose and in the same manner as described in connection with FIG. 1. The threaded portion 63 is fluid sealed as at 67 by means of the O-rings shown.

In all other respects, the operation of the closure member 29 within the modified end connection construction of FIG. 3 takes place same as that hereinabove described. The mounting of the respective parts is also similar to that described in FIG. 1.

While several embodiments have been shown and described, it will be clear that these disclosures serve only the purpose of illustration and not of limitation and the scope of the invention should therefore be measured by the appended claim.

We claim:

A fabricated ball valve including:
(a) a tube-like casing having a transverse aperture extending through a wall portion thereof, said casing having end openings of sufficient diameter for receiving a closure member for insertion or removal therein;
(b) a ported spheroidal closure member adapted to be received by said casing and control flow therethrough;
(c) a hollow extension member transversely extending as a continuation of said aperture and joined in fluid sealing relation to said casing;
(d) removable end disposed annularly positioned back-up ring members in said end openings of said casing, a flange portion on each said ring member extending beyond the end limits of said casing engageable with an associated apertured flange when assembled to form a flanged pipe joint, said ring members being receivable in fluid sealing relation in said end openings to permit the insertion or removal of said closure member axially through said end openings upon removal of said back-up ring members;
(e) seat carrying rings mounted within inner end portions of said back-up ring members in fluid sealing relation thereto and being axially movable between limits defined by the outer seating surface portions of said closure member and said inner end portions of the said back-up ring members under influence created by line fluid pressure within said casing, sufficient clearance being defined between end limits of each seat carrying ring and the associated back-up ring member to provide for said fluid pressure bias of the seat carrying ring;
(f) sealing means interposed between each said back-up ring member and the associated seat carrying ring, said ring members being threadedly engaged in said end portions of said casing; and
(g) end connecting means on said casing for effecting attachment of the valve construction to a pipe line, said means comprising a separate apertured flange fitted over each peripheral end portion of said casing in relatively close relation thereto and surrounding the associated ring member whereby to stiffen and reinforce said casing, ring members and sealing means.

References Cited

UNITED STATES PATENTS

| | | | |
|---|---|---|---|
| 2,303,311 | 11/1942 | Gredell | 285—368 |
| 2,507,851 | 6/1950 | Bryant | 251—142 X |
| 2,840,337 | 6/1958 | Sasserson | 251—367 X |
| 2,868,498 | 1/1959 | Kaiser | 251—172 |
| 2,995,336 | 8/1961 | Usab | 251—315 X |

FOREIGN PATENTS

| | | |
|---|---|---|
| 1,246,562 | 10/1960 | France. |
| 1,055,904 | 1959 | Germany. |

WILLIAM F. O'DEA, *Primary Examiner.*

R. GERARD, *Assistant Examiner.*